(12) United States Patent
Singh (10) Patent No.: US 9,617,974 B2
(45) Date of Patent: Apr. 11, 2017

(54) WIND TURBINE BLADE

(71) Applicant: LM WP PATENT HOLDING A/S, Kolding (DK)

(72) Inventor: Ashish Singh, Lucknow (IN)

(73) Assignee: LM WP Patent Holding A/S, Kolding (DK)

( * ) Notice: Subject to any disclaimer, the term of this patent is extended or adjusted under 35 U.S.C. 154(b) by 422 days.

(21) Appl. No.: 14/360,125

(22) PCT Filed: Nov. 15, 2012

(86) PCT No.: PCT/EP2012/072769
§ 371 (c)(1),
(2) Date: May 22, 2014

(87) PCT Pub. No.: WO2013/076009
PCT Pub. Date: May 30, 2013

(65) Prior Publication Data
US 2014/0286784 A1    Sep. 25, 2014

(30) Foreign Application Priority Data

Nov. 23, 2011    (EP) .................................. 11190375

(51) Int. Cl.
*F03D 1/06*    (2006.01)
(52) U.S. Cl.
CPC ......... *F03D 1/0683* (2013.01); *F03D 1/0633* (2013.01); *F05B 2240/32* (2013.01); *Y02E 10/721* (2013.01)
(58) Field of Classification Search
CPC ...... F03D 1/0683; F03D 1/0633; F03D 1/065; F03D 1/0675; F03D 7/0296; Y02E 10/721; F05B 2240/32; F05B 2250/12; F05B 2250/191; F05B 2260/96; F05D 2240/304
USPC ......... 416/223 R, 228, 231 R, 231 B, 146 R, 416/500
See application file for complete search history.

(56) References Cited

U.S. PATENT DOCUMENTS

| 5,088,665 A | 2/1992 | Vijgen et al. |
| 7,976,276 B2 * | 7/2011 | Riddell ................. F03D 1/0633 416/223 R |
| 2010/0143151 A1 | 6/2010 | Kinzie et al. |

(Continued)

FOREIGN PATENT DOCUMENTS

| GB | 329783 A | 5/1930 |
| WO | 2007/057155 A1 | 5/2007 |

(Continued)

*Primary Examiner* — Michael R Reid
(74) *Attorney, Agent, or Firm* — Nath, Goldberg & Meyer; Jerald L. Meyer; Tanya E. Harkins (57) ABSTRACT

A wind turbine blade is described having noise reduction features. The blade has a plurality of projecting serrations provided at the blade trailing edge to reduce the scattering noise produced during operation of the blade, wherein the serrations have a plurality of through-going apertures defined in the serration body. The apertures act to provide a pressure equalization effect at the serrations between the suction and pressure sides. This pressure equalization provides for improved noise reduction performance, as well as a reduction in mechanical stresses and strains which may be experienced by the serrations, increasing serration lifetime.

15 Claims, 6 Drawing Sheets

(56) References Cited

U.S. PATENT DOCUMENTS

| | | | |
|---|---|---|---|
| 2011/0142629 A1* | 6/2011 | Pesetsky | F03D 1/0675 |
| | | | 416/23 |
| 2011/0142635 A1 | 6/2011 | Fritz | |
| 2011/0142637 A1 | 6/2011 | Riddell et al. | |
| 2011/0142666 A1 | 6/2011 | Drobietz et al. | |
| 2014/0377077 A1* | 12/2014 | Gruber | F01D 5/141 |
| | | | 416/228 |

FOREIGN PATENT DOCUMENTS

| WO | 2008051293 A2 | 5/2008 |
|---|---|---|
| WO | 2010063600 A2 | 6/2010 |

* cited by examiner

WIND TURBINE BLADE

This is a National Phase Application filed under 35 U.S.C. 371 as a national stage of PCT/EP2012/072769, filed Nov. 15, 2012, and claims priority benefit from European Application No. 11190375.3, filed Nov. 23, 2011, the content of each of which is hereby incorporated by reference in its entirety.

FIELD OF THE INVENTION

The present invention relates to a wind turbine blade having noise reduction features.

BACKGROUND OF THE INVENTION

One of the primary considerations in the design and operation of wind turbines is the noise levels produced during operation of the wind turbine. Particularly in the case of on-shore wind turbines which may be located close to inhabited areas, the noise from wind turbines can be a limiting factor when considering possible wind turbine locations. Accordingly, it is of interest to provide for wind turbine designs having reduced noise output during operation.

A large portion of the noise produced during wind turbine operation is due to turbulence formed at the trailing edge of a wind turbine blade, as the relatively faster suction-side airflow meets with the relatively slower pressure-side airflow. The relatively high level of turbulent kinetic energy in the combined airflows results in a turbulent scattering of airflow at the trailing edge, which produces scattering noise.

It is known to provide fixed serrations or bristles at the trailing edge of a wind turbine blade in order to disrupt the trailing edge airflow, thereby damping or reducing the turbulence formed at the trailing edge, and consequently the associated noise levels. Examples of trailing edge serrations can be seen in US Patent Publication No. US 2011/0142666 A1.

However, such noise-reducing features do not provide a complete elimination of trailing edge noise during blade operation.

It is an object of the invention to provide a wind turbine blade having improved noise-reducing characteristics over the known blade designs.

SUMMARY OF THE INVENTION

Accordingly, there is provided a wind turbine blade for a rotor of a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end, the wind turbine blade comprising a profiled contour including a pressure side and a suction side, as well as a leading edge and a trailing edge with a chord having a chord length extending therebetween, the profiled contour, when being impacted by an incident airflow, generating a lift, wherein the wind turbine blade further comprises a plurality of serrations provided at the trailing edge of the contour, said serrations projecting free of said trailing edge or extending freely of said trailing edge, said plurality of serrations operable to reduce noise generated during operation of the blade by modulation of the airflow at the trailing edge of the contour, said plurality of serrations each comprising a substantially triangular serration body having a proximal base end located adjacent said trailing edge and a distal tip end projecting away from said trailing edge and serration side edges extending between said proximal base end and said distal tip end, wherein at least one through-going aperture is defined in said substantially triangular serration body between said base end and said tip end.

Preferably, the serration body comprises a pressure side surface and a suction side surface, wherein said at least one through-going aperture extends from said pressure side surface to said suction side surface, wherein said at least one through-going aperture acts to equalise pressure between said pressure side surface and said suction side surface.

Such a construction ensures that pressure or airflow communication can occur between the suction and pressure sides of the serrations. This pressure communication allows for a pressure equalization to occur on either side of the serrations. As a result, the use of serrations having through-going apertures provides several advantages:

1. Pressure equalization on the serration surfaces reduces the energy of the turbulent vortices which is scattered from the edges of the serrations. As the serrations act to reduce low frequency noise at the blade trailing edge, this helps to reduce high frequency noise largely generated by the serrations themselves.
2. Furthermore, pressure equalization due to the apertures helps to reduce variations in pressure differences at either side of the serrations, which is the main cause for serration fluttering during blade operation. Serration fluttering can lead to detachment of serrations at moderate to high angle of attacks. Accordingly, the use of the through-going apertures acts to increase the adherence of the serrations to the blade.
3. Apertures in the serrations can provide additional advantages while changing blade pitch when the turbine is operational. Changing the blade pitch during operation can impose additional dynamic forces on serrations. This may lead to dramatic detachment or damage of serrations. As the presence of apertures in the serrations relaxes the pressure difference between two sides, accordingly the serrations stability is increased against rapidly changing flow dynamics due to pitching.

In a preferred aspect, the serrations extend from the trailing edge of the blade, wherein the apertures are defined in that portion of the serrations which extends freely of the blade. By extending freely, it will be understood that this refers to the projecting portions of the serrations, and not any sections of a serration construction used for the mounting or securing of serrations to a wind turbine blade.

A mounting portion or base plate may be provided, from which the serrations project, said mounting portion or base plate used to secure said serrations to a wind turbine blade Preferably, said at least one through-going aperture is defined such that the width of the aperture is greater than or equal to the depth of the aperture.

The aperture has a width, which can be measured along the surface of the serration which the aperture opens onto, and a depth, which corresponds to the local depth of the serration that the aperture extends through. By configuring the through-going aperture to be at least as wide as it is deep, this ensures that the aperture diameter is greater than or equal to the thickness of the serration body, to ensure maximum pressure equalization between the pressure side and the suction side of the serrations.

Preferably, said serrations are configured such that said at least one through-going aperture comprises less than or equal to 25% of the area of an outline of the serration body.

The outline of the serration body comprises the area projected by the serration which is formed between the base end, tip end, and side edges of the serration. As the apertures account for less than or equal to a quarter of the projected profile area of the serrations, accordingly the serration structural stability is not compromised, and additional operational noise is not introduced as a result of using excessively large apertures. In the case of a triangular serration, this means that the through-going apertures account for less than 25% of the triangular area.

In one embodiment, at least one of said through-going apertures is substantially circular in shape. Additionally or alternatively, at least one of said through-going apertures is substantially oval in shape. Additionally or alternatively, at least one of said through-going apertures is substantially rectangular in shape.

Different shapes of apertures may be selected based on the particular noise reduction, modulation, and/or pressure equalization it is desired to perform at the serration.

In one embodiment, said serrations comprise at least one primary array of through-going apertures arranged in a longitudinal direction between the proximal base end of the serration and the distal tip end of the serration, and at least one secondary array of through-going apertures arranged adjacent said primary array.

The use of different arrays of apertures on the serration allows for different effects of the apertures to be provided at the serrations.

Preferably, said at least one primary array extends along a central longitudinal axis of the serration body between said proximal base end and said distal tip end.

The positioning of the primary array of apertures along the centreline of the serration allows for the primary flow direction of airflow over the serration to experience efficient pressure equalization through the primary array.

In one configuration, said primary array comprises at least one elongate aperture oriented with a primary axis extending in a direction between the proximal base end and the distal tip end. Additionally or alternatively, said primary array comprises at least one substantially circular aperture.

The primary axis of the aperture is understood as the axis corresponding to the widest section of the aperture, e.g. for an oblong, elongate, or rectangular aperture.

Preferably, said at least one secondary array is located between said at least one primary array and one of said side edges of the serration body, wherein said at least one secondary array comprises at least one substantially elongate aperture, and wherein said at least one elongate aperture of said at least one secondary array is arranged such that a primary axis of said at least one aperture extends in a substantially lateral direction from adjacent said at least one primary array towards said side edge of the serration body.

By proving elongate apertures in the secondary array, and aligning the elongate apertures in a lateral direction towards the sides of the serration, the apertures are oriented to be substantially in line with the lateral flow path of the airflow over the serrations. This ensures that pressure equalization of the airflow over the serrations is maximized.

In one embodiment, said profiled contour has a blunt trailing edge comprising a trailing edge surface extending between the pressure side and the suction side of the contour at said trailing edge, wherein said plurality of serrations are located at the pressure side and/or the suction side of said trailing edge surface. Accordingly, the serrations are arranged such that the proximal base ends of the serrations are located adjacent the trailing edge surface, with the distal tip ends projecting away from the trailing edge of the blade.

Preferably, a first subset of said plurality of serrations are provided at the pressure side of said trailing edge surface, and a second subset of said plurality of serrations are provided at the suction side of said trailing edge surface.

In one embodiment, said first and second subsets of serrations comprise first and second longitudinal arrays of serrations which project from said trailing edge along the longitudinal length of a portion of the blade in a spaced parallel arrangement.

In an alternate embodiment, said first and second subsets of serrations comprise a series of serration groups having a base plate and a plurality of serrations projecting from said base plate, said serration groups provided at said trailing edge along the longitudinal length of a portion of the blade, wherein successive serration groups along the longitudinal length of the blade are alternately positioned on the pressure side and the suction side of said trailing edge surface.

In a further alternate embodiment, said plurality of serrations are provided as spaced single serrations arranged at said trailing edge along the longitudinal length of a portion of the blade, wherein successive serrations along the longitudinal length of the blade are alternately positioned on the pressure side and the suction side of said trailing edge surface.

By staggering the serrations, or serration groups, at the pressure and suction sides of the trailing edge, a partial noise reduction is provided at both sides of the trailing edge. Furthermore, potential damage caused between adjacent serrations or serration groups due to fluttering is minimized.

Preferably, at least a first array of said plurality of serrations is moveable relative to the trailing edge of the blade.

A moveable array of serrations allows for adjustment of the noise modulation performed at the trailing edge of the blade. Preferably the array is translationally moveable relative to the trailing edge, but it will be understood that any characteristic of the array may be adjustable, e.g. the positioning, length, dimensions, etc. of the serrations may be varied to provide for a variable modulation of noise spectra at the trailing edge of the blade.

Preferably, the wind turbine blade is operable to adjust the shape of said at least one through-going aperture.

Preferably, said adjustment is controlled to adjust the pressure equalisation effect provided by said at least one through-going aperture. This may be through use of for example a piezoelectric material, a flexible deformable material, etc.

Additionally or alternatively, the wind turbine blade further comprises at least one cover member moveable relative to said at least one through-going aperture, said cover member operable to selectively cover at least a portion of at least one through-going aperture. The cover member may be coupled to an actuator operable to move said cover member relative to said at least one aperture, to control the size of an opening of the aperture, to control the pressure equalisation effect provided by said at least one through-going aperture.

The use of a moveable cover, shutter, or skin to adjust the aperture openings allows for the variation of the pressure equalisation effect provided by the apertures. In an alternative embodiment, the cover member may comprise an inflatable element which is arranged to selectively inflate or deflate at least partially within said aperture, to reduce the size of the through-going opening of the aperture.

Additionally or alternatively, an air permeable material may be provided within the apertures, e.g. a net, a web, a mesh. The air permeable material may comprise a relatively resilient material. This may provide for additional structural integrity of the serrations, to prevent serration deflection or deformation due to the presence of the apertures in the serration body.

There is also provided a wind turbine having at least one wind turbine blade as described above.

DESCRIPTION OF THE INVENTION

Embodiments of the invention will now be described, by way of example only, with reference to the accompanying drawings, in which.

Figure 1:
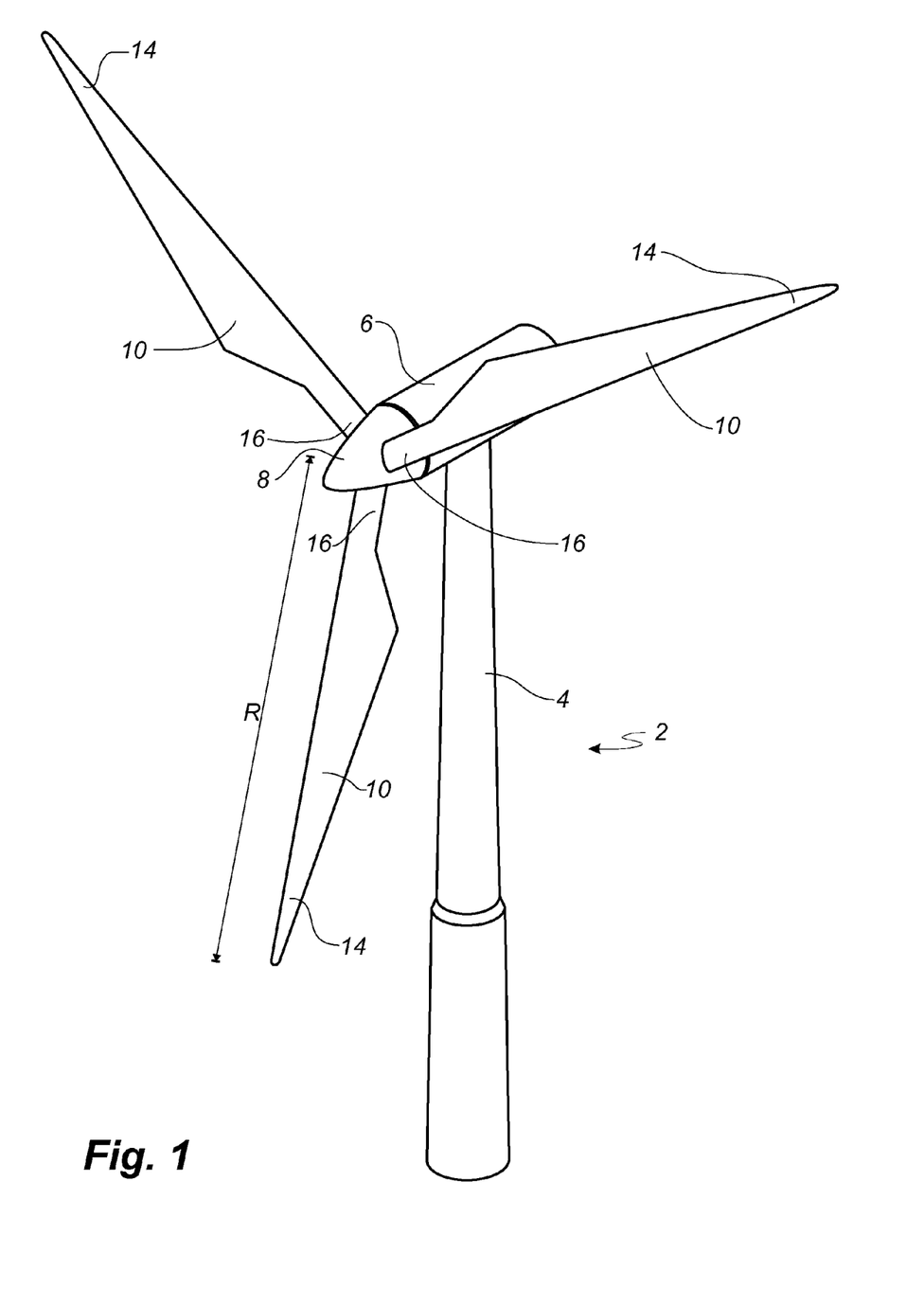
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
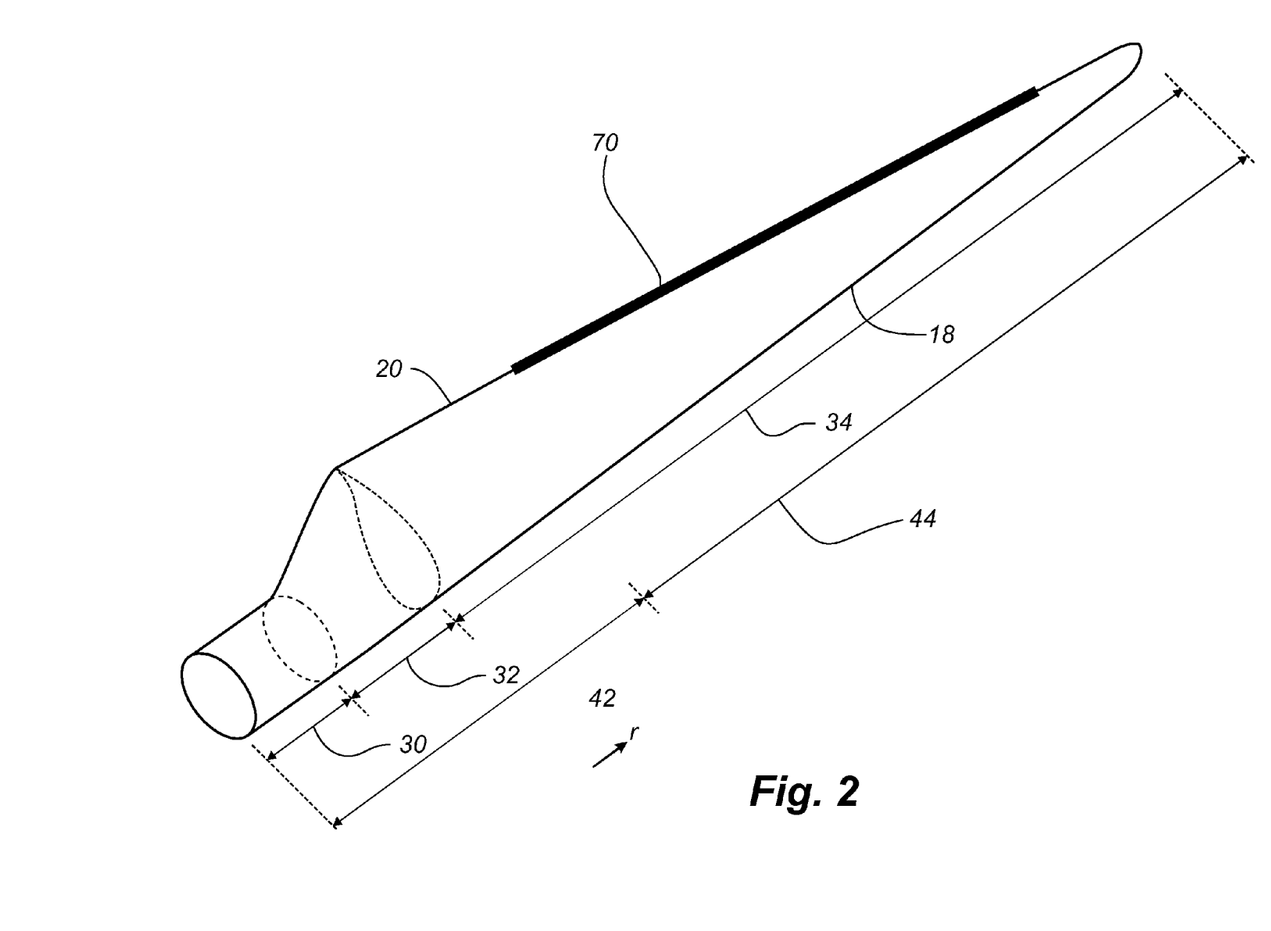
FIG. 2 shows a schematic view of a wind turbine blade according to the invention.

FIG. 2 shows a schematic view of a first embodiment of a wind turbine blade 10 according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
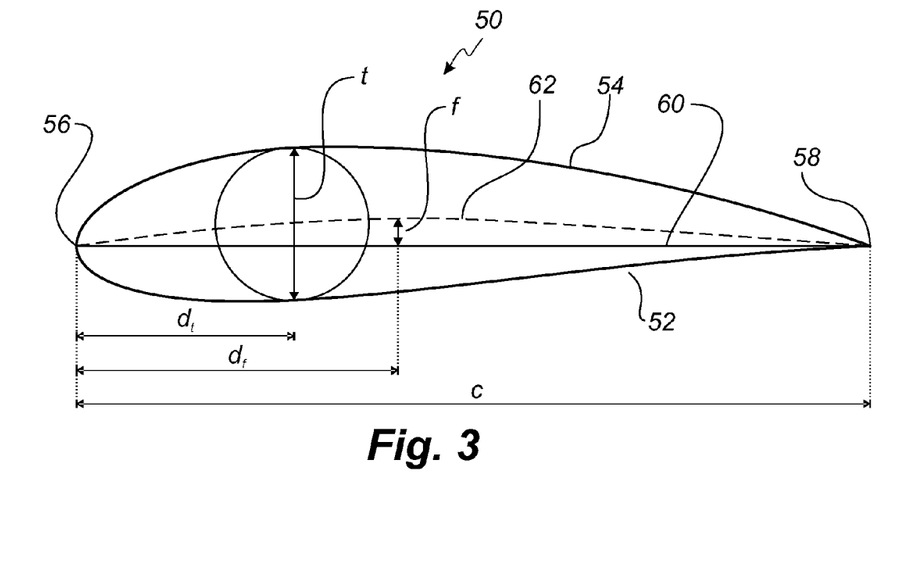
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Figure 4:
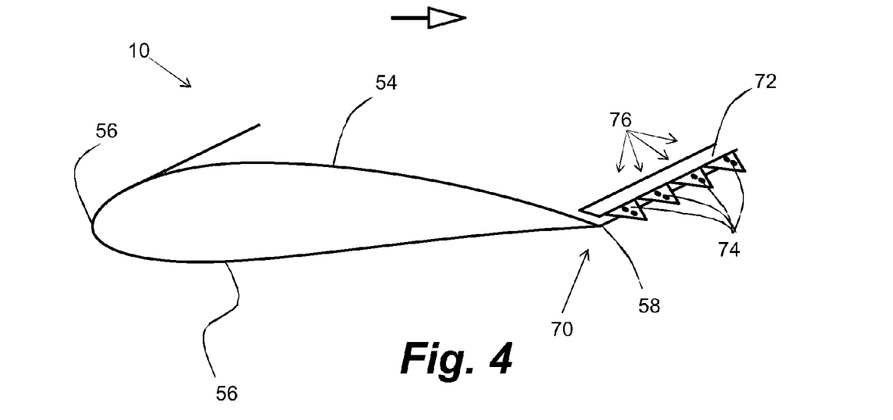
FIG. 4 shows a cross-sectional perspective view of a portion of the blade of FIG. 2.

With reference to FIG. 4, an enlarged view of a portion of the wind turbine blade 10 of FIG. 2 is shown, with reference to the elements of the airfoil 50 shown in FIG. 3. The blade 10 further comprises a serration array 70 provided at the trailing edge 58 of the blade 10. The array 70 comprises a base plate 72 which extends along a portion of the blade trailing edge 58 and a plurality of serrations 74 which project from the base plate 72. The serrations 74 substantially project in a direction away from the leading edge 56 of the blade 10, substantially in line with the mean flow direction at the trailing edge 58 of the blade 10.

The serrations 74 act as flow modulation elements, to modulate a boundary layer airflow at the trailing edge of the wind turbine blade, in order to mitigate, frequency shift, and/or eliminate scattering noise generated at the trailing edge 58 of the wind turbine blade 10.

The serrations 74 are configured such that a plurality of through-going apertures (indicated generally at 76) are defined in the serrations 74. The apertures 76 are arranged such that they extend through the body of the serrations 74 from a first serration surface on the pressure side 52 of the blade 10 to a second serration surface on the suction side 54 of the blade 10. The serrations 76 ensure that pressure or airflow communication can occur between the suction and pressure sides of the serrations 76, which allows for a pressure equalisation to occur on either side of the serrations 76.

This pressure equalisation acts to reduce the turbulent vortex energy which is scattered from the edges of the serrations. As the serrations act to reduce low frequency noise at the blade trailing edge, the presence of the apertures helps to reduce high frequency noise generated by the serrations themselves.

A further surprising advantage of the use of apertures in the serrations allows for an increase in the reliability and lifetime of serrations on a wind turbine blade. The pressure equalisation effect produced by the apertures reduces variations in pressure differences at either side of the serrations. Normally, when serrations experience large pressure differences between serration sides, this can result in serration fluttering, a vibrational movement of the serrations at the blade trailing edge. Serration fluttering can lead to detachment of serrations at moderate to high angle of attacks, for different operating Reynolds numbers. Accordingly, the use of the through-going apertures acts to increase the effective adherence of the serrations to the blade, thereby increasing serration lifetime.

Another beneficial effect of providing apertures in the serrations is the additional advantages which occur while changing blade pitch when the turbine is operational. As additional dynamic forces may be experienced by the serrations when changing the pitch of the blades, this may lead to dramatic detachment or damage of serrations. However, the presence of apertures in the serrations acts to relax the pressure difference between two sides, and accordingly the serration stability is increased against rapidly changing flow dynamics due to pitching.

Figure 5A:
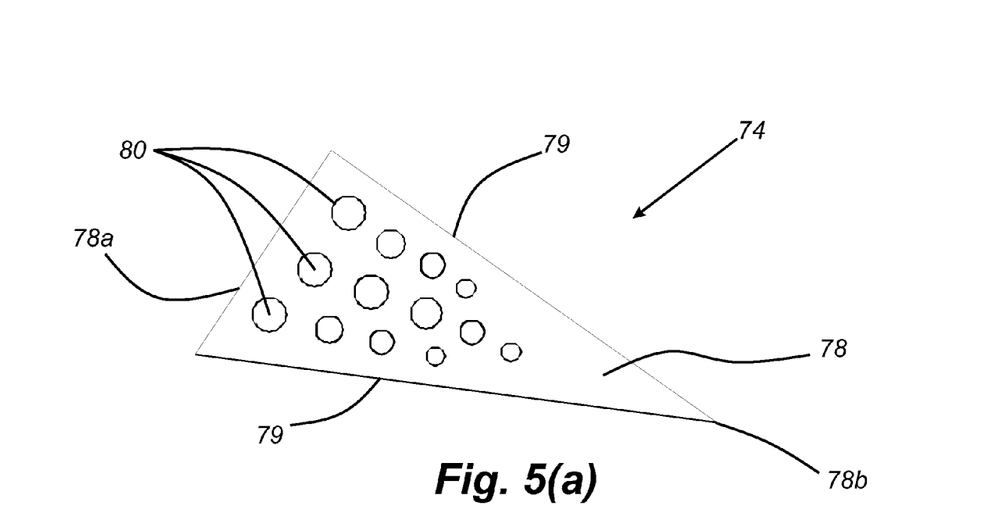
FIGS. 5(a) and 5(b) show enlarged perspective views of first and second embodiments of trailing edge serrations according to the invention.
Figure 5B:
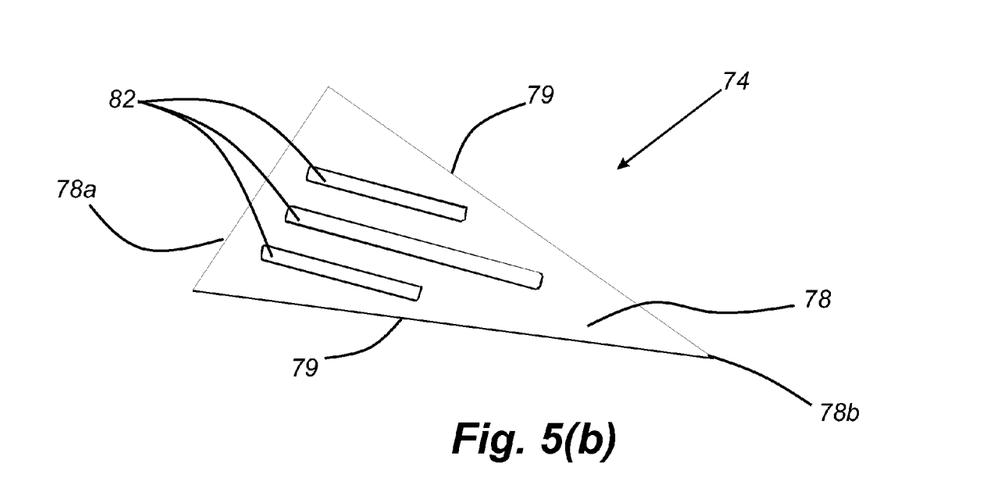
Figure 6A:
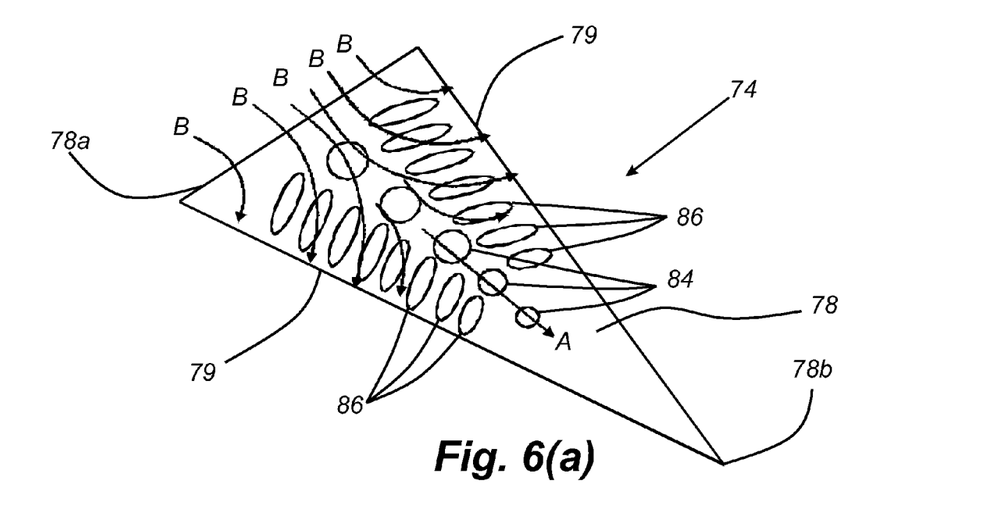
FIGS. 6(a) and 6(b) show enlarged perspective views of third and forth embodiments of trailing edge serrations according to the invention.
Figure 6B:
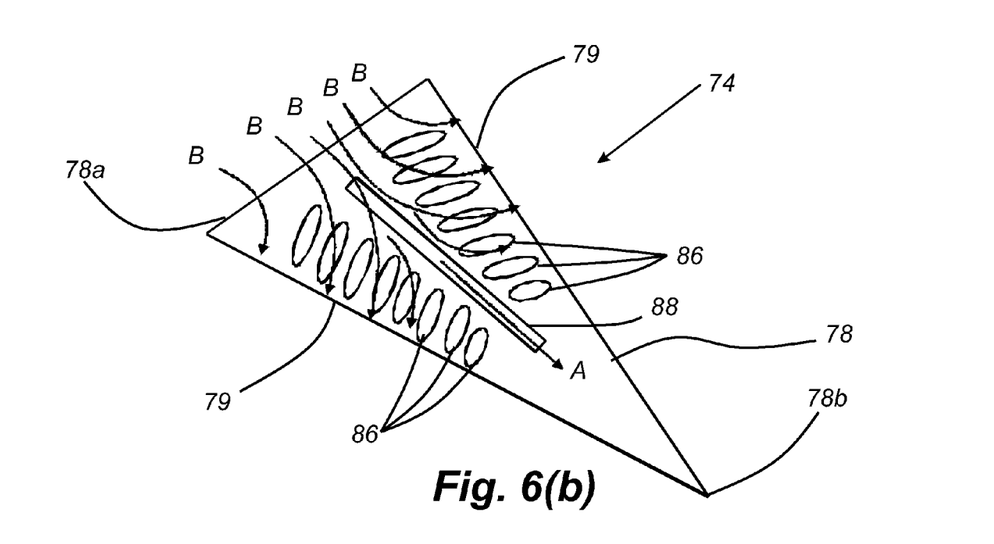

While the apertures 76 provided in the serrations 74 may comprise a single hole provided in the serration body, it will be understood that other aperture configurations may be provided. With reference to FIGS. 5 and 6, enlarged views are provided of sample aperture arrangements for a single triangular-shaped serration. However, it will be understood that the invention may be applied to any suitable serration shape, e.g. crenulations, semi-circular serrations, etc.

In FIGS. 5 and 6, the serration 74 comprises a substantially planar triangular main body 78, having a proximal base end 78a and a distal tip end 78b. In use, the serration 74 is arranged such that the proximal base end 78a is provided adjacent the trailing edge of a wind turbine blade (not shown), the distal tip end 78b projecting away from the trailing edge in a direction substantially in line with the mean flow direction of the contour of the wind turbine blade. Serration side edges 79 extend between the proximal base end 78a and the distal tip end 78b.

In the embodiment of FIG. 5(a), a plurality of circular apertures 80 are provided on the serration body 78, the apertures 80 extending through the serration body 78 from an upper surface of the body to a lower surface of the body 78. The apertures 80 are arranged in a spaced parallel series arrangement, from a location adjacent the proximal base end 78a towards the distal tip end 78b.

In the embodiment shown in FIG. 5(b), a plurality of rectangular through-going apertures 82 are provided on the serration body 78, the apertures extending in a parallel arrangement from adjacent the proximal base end 78a towards the distal tip end 78b.

The apertures 80,82 are preferably arranged in the form of several parallel rows of spaced apertures (as with the circular apertures 80 of FIG. 5(a)), or a parallel arrangement of several elongate apertures (as with the rectangular apertures 82 of FIG. 5(b)). Accordingly, the aperture distribution is provided substantially in line with the airflow direction over the serrations 74.

With reference to FIGS. 6(a) and 6(b), enlarged views are provided of further sample aperture arrangements for a single triangular-shaped serration.

In FIG. 6(a), a primary series of spaced substantially circular apertures 84 are provided along the centreline of the serration body 78, extending from a position adjacent the midpoint of the proximal base end 78a of the serration body 78 to a location towards the distal tip end 78b of the body 78.

On either side of the primary series of apertures 84, a secondary series of oval apertures 86 are located between the primary apertures 84 and the serration side edges 79. As with the primary apertures 84, the secondary oval apertures 86 are spaced in a line from a location close to the proximal base end 78a towards the distal tip end 78b. The secondary oval apertures 86 are arranged such that the ovals are oriented to extend in an outward direction between the centred primary series of apertures 84 and the serration edges 79.

Accordingly, as air flows over the serration body 78, the airflow of the main flow direction (i.e. along the centreline of the serration 76) will directly flow over the primary series of apertures 84 (as indicated by arrow A). Airflow which is not in line with the main flow direction will flow in a substantially lateral direction relative to the main flow direction, i.e. from the centreline towards the side edges 79 of the serration body 78 (this is indicated by the arrows marked B). As a result, the lateral airflow is directed over the secondary series of apertures 86.

Preferably, said secondary series of apertures 86 are aligned such that the direction of elongation of the apertures is substantially in line with the direction of lateral flow over the serration body. This may be between 0-90 degrees, preferably between 45-90 degrees relative to the central longitudinal axis or centreline of the serration body. Aligning the secondary apertures in such a manner will ensure that the pressure equalisation effect of the secondary apertures on lateral flow over the serrations will be maximised. Having apertures in line with the flow direction will provide sufficient length, and accordingly sufficient time, for flow to communicate between the suction and pressure sides.

FIG. 6(b) shows a similar configuration to FIG. 6(a), where the primary series of circular apertures 84 is replaced with a single rectangular primary aperture 88, the primary aperture 88 extending in an elongate direction from a position adjacent the midpoint of the proximal base end 78a of the serration body 78 to a location towards the distal tip end 78b of the body 78. As with the embodiment of FIG. 6(a), the primary airflow over the serration 74 is directed over the primary aperture 88, with lateral flow being directed over the adjacent secondary series of apertures 86, to provide for a maximised pressure equalisation effect.

In a preferred arrangement, the apertures 76,80,82,84,86,88 are dimensioned such that the width of the apertures 76,80,82,84,86,88 is greater than or equal to the depth of the serration body 78, to ensure that airflow is easily communicated between the serration surfaces. This provides for effective pressure equalisation between the surfaces, and improved performance of the serrations 78. For example, in the embodiment of FIG. 5(a), the diameter of the apertures 80 is selected to be greater than the depth of the through-going apertures 80.

In a further preferred arrangement, the apertures 76,80, 82,84,86,88 are arranged such that they account for less than or equal to 25% of the area of the triangular profile defined by the outer edges of the serration body 78. This ensures that the structural integrity of the serrations 74 is not weakened by having excessive apertures and also that additional operational noise is not introduced as a result of using excessively large apertures 76,80,82,84,86,88.

As shown in FIG. 4, the serrations 74 may be provided as a single serration array 70 located at the blade trailing edge 58. It will be understood that other serration configurations may be applied, for example a pair of serration array may be provided at the trailing edge, the serration arrays moveable relative to each other.

Figure 7A:
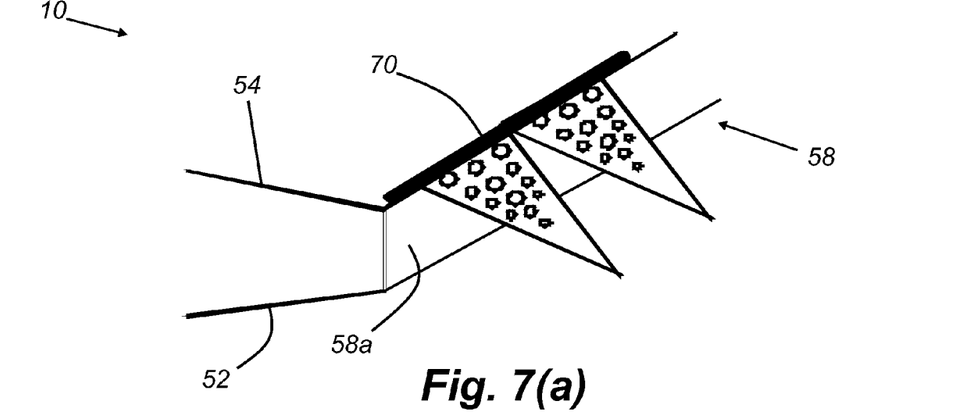
FIGS. 7(a), (b) and (c) show enlarged perspective views of arrangements of trailing edge serrations according to further embodiments of the invention. Common elements between the different embodiments will be referred to using the same reference numerals.

In a further alternative, the serrations may be provided for a truncated blade profile. With reference to FIG. 7, in a truncated profile the wind turbine blade has a blunt or truncated trailing edge 58, having a trailing edge surface 58a. In such a truncated blade 10, the serrated array 70 may be provided at one or both of the pressure side 52 or the suction side 54 of the trailing edge surface 58a. (In the view shown in FIG. 7(a), the serrated array 70 is provided at the suction side 54 of the trailing edge surface 58a.)

Figure 7B:
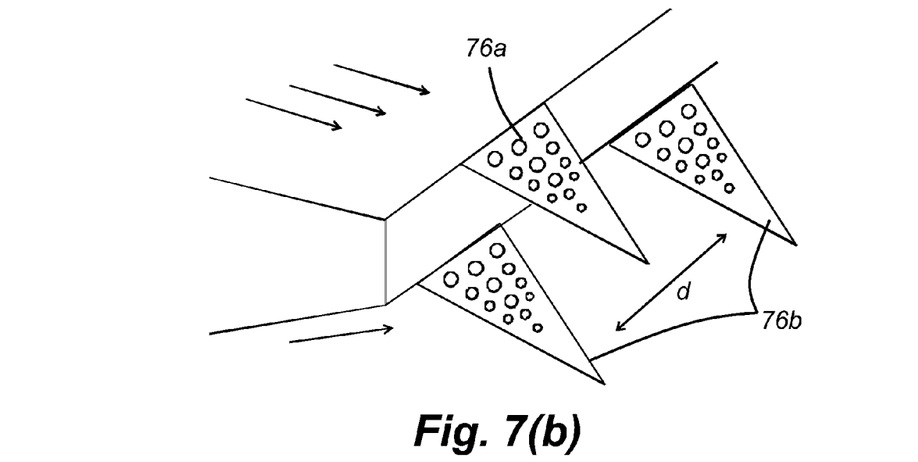

In order to further prevent damage or separation of serrations from the blade due to fluttering, the serrations may be dispersed or staggered on either side of the trailing edge surface 58a, such that a partial noise reduction effect will be provided for airflow on both sides of the trailing edge, while any damage caused between adjacent serrations will be prevented due to the spacing between individual serrations. Such an arrangement is illustrated in FIG. 7(b), wherein a first series of serrations 76a are provided on the suction side 54 of the trailing edge surface, and a second series of serrations 76b are provided on the pressure side 54 of the trailing edge surface 58a. The serrations 76a,76b may be arranged such that the inter-serration distance d of at least one of the series of serrations is approximately equivalent to the width of the serrations of the other series, such that an interleaved continuous serration profile is presented at the trailing edge 58, with successive serrations 76a,76b being provided on alternate sides of the trailing edge surface 58a.

Figure 7C:
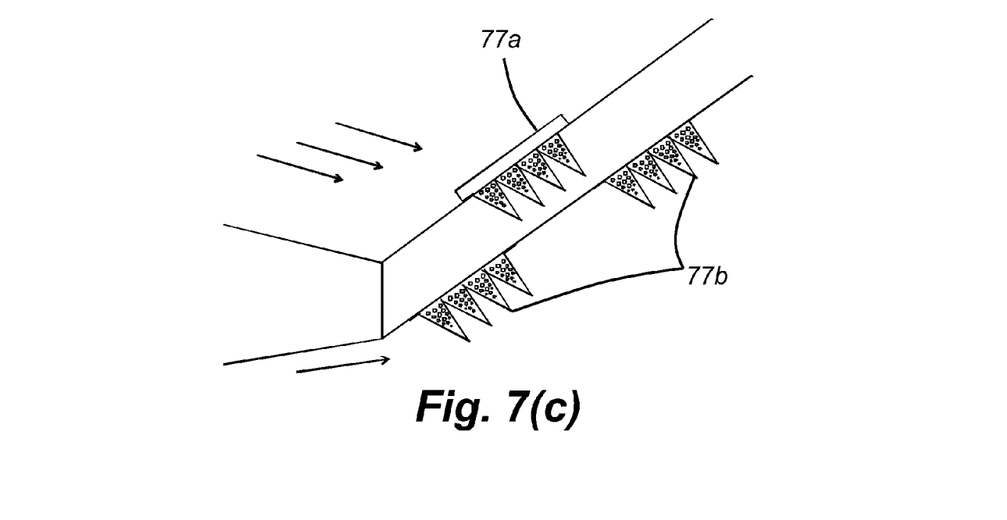

A further alternative configuration is illustrated in FIG. 7(c), wherein the serrations 76 are provided in the form of individual groups or clusters of serrations 77a,77b, successive serration groups being provided on alternate sides of the trailing edge surface 58a, thereby providing preventing damage between adjacent serration groups 77a,77b.

In a further enhancement of the invention, it will be understood that the serrations 76,76a,76b or serration groups 77a,77b may be moveable relative to the trailing edge of the blade, preferably translationally moveable, in order to provide further control and adaptability of the noise reducing characteristics of the blade.

Additionally or alternatively, the serrations may be configured wherein the size or shape of the apertures defined on the serrations may be adjustable, to provide for adjustable pressure equalisation performance. This may be in the form of any suitable adjustment method, e.g. forming the serrations from a piezoelectric material. Additionally or alternatively, the serrations may be coupled with an adjustable sleeve or cover (not shown) which is operable to be moved relative to the serration body, to selectively cover or open the apertures defined in the serration body.

Furthermore, it will be understood that while the serrations and serration groups 76,77 illustrated herein are substantially planar, three-dimensional serrations may also be employed at the blade trailing edge to reduce scattering noise, i.e. serrations which may vary in depth as well as width.

In an additional enhancement, an air permeable material may be provided within the apertures, e.g. a net, a web, a mesh. If the air permeable material is formed from a relatively resilient material, e.g. wire, resilient rubber, etc., this may provide for additional structural integrity of the serrations, to prevent serration deflection or deformation due to the presence of the apertures in the serration body.

It will be understood that the serrations 76 are provided at the trailing edge of the blade, along the longitudinal length of the blade. Preferably, the serrations are provided in the region of 40-98% of the length of the blade from the root end of the blade. In an alternative embodiment, the serrations are provided in the region of 60-95% of the length of the blade. As the majority of the noise-generation of a wind turbine blade occurs towards in the region towards the outer sections of the blade (due to the relatively high wind speeds in effect at these outer sections), the noise reducing features will perform most effectively when located in these regions.

It will be understood that any features of the above embodiments may be interchangeable with the features of any other embodiment without departing from the scope of the invention.

The invention is not limited to the embodiments described herein, and may be modified or adapted without departing from the scope of the present invention.

The invention claimed is:

1. A wind turbine blade for a rotor of a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end,
the wind turbine blade comprising a profiled contour including a pressure side and a suction side, as well as a leading edge and a trailing edge with a chord having a chord length extending therebetween, the profiled contour, when being impacted by an incident airflow, generating a lift,
wherein the wind turbine blade further comprises a plurality of serrations provided at the trailing edge of the contour, said serrations projecting free of said trailing edge, said plurality of serrations operable to reduce noise generated during operation of the blade by modulation of the airflow at the trailing edge of the contour, said plurality of serrations each comprising a substantially triangular serration body having a proximal base end located adjacent said trailing edge and a distal tip end projecting away from said trailing edge and serration side edges extending between said proximal base end and said distal tip end,
wherein at least one through-going aperture is defined in said substantially triangular serration body between said base end and said tip end.

2. The blade of claim 1, wherein the serration body comprises a pressure side surface and a suction side surface, wherein said at least one through-going aperture extends from said pressure side surface to said suction side surface, wherein said at least one through-going aperture acts to equalise pressure between said pressure side surface and said suction side surface.

3. The blade of claim 1, wherein said at least one through-going aperture is defined such that the width of the aperture is greater than or equal to the depth of the aperture.

4. The blade of claim 1, wherein said serrations are configured such that said at least one through-going aperture comprises less than or equal to 25% of the area of an outline of the serration body.

5. The blade of claim 1, wherein at least one of said through-going apertures is selected from the following: a circular aperture; an oval aperture; a substantially rectangular aperture.

6. The blade of claim 1, wherein said serrations comprise at least one primary array of through-going apertures arranged in a longitudinal direction between the proximal base end of the serration and the distal tip end of the serration, and at least one secondary array of through-going apertures arranged adjacent said primary array.

7. The blade of claim 6, wherein said at least one primary array extends along a central longitudinal axis of the serration body between said proximal base end and said distal tip end.

8. The blade of claim 6, wherein said primary array comprises at least one of the following: an elongate aperture oriented with a primary axis extending in a direction between the proximal base end and the distal tip end; at least one substantially circular aperture.

9. The blade of claim 6, wherein said at least one secondary array is located between said at least one primary array and one of said side edges of the serration body, wherein said at least one secondary array comprises at least one substantially elongate aperture, and wherein said at least one elongate aperture of said at least one secondary array is arranged such that a primary axis of said at least one aperture extends in a substantially lateral direction from adjacent said at least one primary array towards said side edge of the serration body.

10. The blade of claim 1, wherein said profiled contour has a blunt trailing edge comprising a trailing edge surface extending between the pressure side and the suction side of the contour at said trailing edge, wherein the proximal base ends of said plurality of serrations are located at the pressure side and/or the suction side of said trailing edge surface.

11. The blade of claim 10, wherein a first subset of said plurality of serrations are provided at the pressure side of said trailing edge surface, and a second subset of said plurality of serrations are provided at the suction side of said trailing edge surface.

12. The blade of claim 1, wherein an air permeable material is provided within said at least one aperture.

13. The blade of claim 1, wherein at least a first array of said plurality of serrations is moveable relative to the trailing edge of the blade.

14. The blade of claim 1, wherein an air permeable material is provided within said at least one through-going aperture.

15. A wind turbine having at least one wind turbine blade as claimed in claim 1.

* * * * *